(12) United States Patent
Han et al.

(10) Patent No.: US 7,148,896 B2
(45) Date of Patent: Dec. 12, 2006

(54) METHOD FOR REPRESENTING IMAGE-BASED RENDERING INFORMATION IN 3D SCENE

(75) Inventors: Mahn-jin Han, Kyungki-do (KR); Alexey Ignatenko, Moscow (RU)

(73) Assignee: Samsung Electronics Co., Ltd., Suwon (KR)

( * ) Notice: Subject to any disclaimer, the term of this patent is extended or adjusted under 35 U.S.C. 154(b) by 156 days.

(21) Appl. No.: 10/188,845

(22) Filed: Jul. 5, 2002

(65) Prior Publication Data

US 2003/0048266 A1    Mar. 13, 2003

(30) Foreign Application Priority Data

Jul. 9, 2001 (KR) ............................... 2001-40975

(51) Int. Cl.
*G06T 15/70* (2006.01)

(52) U.S. Cl. ........................................ 345/473; 345/419

(58) Field of Classification Search ................ 345/419, 345/423, 427, 473, 474, 722, 723; 382/103, 382/154; 33/203.18, 288; 356/139.09, 155
See application file for complete search history.

(56) References Cited

U.S. PATENT DOCUMENTS

| | | | | |
|---|---|---|---|---|
| 4,694,404 A * | 9/1987 | Meagher | ...................... | 345/421 |
| 5,123,084 A * | 6/1992 | Prevost et al. | ............... | 345/420 |
| 5,600,763 A * | 2/1997 | Greene et al. | ............... | 345/420 |
| 5,819,017 A | 10/1998 | Akeley et al. | | |
| 6,064,750 A * | 5/2000 | January et al. | ............. | 382/103 |
| 6,169,516 B1 * | 1/2001 | Watanabe et al. | ...... | 342/357.13 |
| 6,222,937 B1 * | 4/2001 | Cohen et al. | ............. | 382/154 |
| 6,407,738 B1 * | 6/2002 | Wakabayashi | ............. | 345/424 |
| 6,466,207 B1 * | 10/2002 | Gortler et al. | ............. | 345/427 |
| 6,509,898 B1 * | 1/2003 | Chi et al. | ................... | 345/440 |
| 6,567,081 B1 * | 5/2003 | Li et al. | ..................... | 345/419 |
| 6,654,031 B1 * | 11/2003 | Ito et al. | ..................... | 345/723 |
| 6,677,945 B1 * | 1/2004 | Lapidous et al. | ........... | 345/422 |

FOREIGN PATENT DOCUMENTS

| | | |
|---|---|---|
| JP | 8055239 | 2/1996 |
| JP | 9006986 | 1/1997 |
| JP | 10253322 | 9/1998 |
| JP | 2002293709 | 10/2000 |

OTHER PUBLICATIONS

Foley et al., Computer Graphics: Principles and Practice Second Edition in C, 1997, Addison-Wesley Publishing Co., chapters 12 and 15.*

(Continued)

*Primary Examiner*—Mark Zimmerman
*Assistant Examiner*—Enrique L. Santiago
(74) *Attorney, Agent, or Firm*—Buchanan Ingersoll & Rooney PC

(57) ABSTRACT

A method for enabling to use an Image-Based Rendering (IBR) technology in Animation Framework extension (AFX) technology is provided. In the method for representing an object in a 3D scene using an IBR technology in the 3D scene, image information and depth information on each point of the image are used, or image information and a depth information array of all points projected on each point onto a plane of the image or a color information array of each point are used. In the method, by defining expression methods for GBT, LDI, and Octree that are simple method among IBR technologies having geometric information, those methods can be used in the MPEG-4 AFX.

12 Claims, 7 Drawing Sheets

OTHER PUBLICATIONS

Moller et al., Real-Time Rendering, 1999, A K Peters, Ltd., chapter 7.*
ISO/IEC JTC 1/SC 29/WG 11 N3850, dated Oct. 19, 2000, ISO/IEC144961:2000(E), pp. 1-698.
Org.Iso.mpeg.mpegj, undated compilation of html files.
European Search Report issued by the European Patent Office on Jul. 23, 2004 in corresponding Appl. No. 02 25 4691.
M. M. Oliveira et al., "Relief Texture Mapping," Computer Graphics Proceedings, Annual Conference Series, 2000; SIGGRAPH 2000, New Orleans, Louisiana, Jul. 23-28, 2000, pp. 359-368.
Manuel M. Oliveira et al., "Image-Based Objects," Proceedings of the 1999 Symposium on Interactive 3D Graphics, Atlanta, GA., Apr. 26-28, 1999, pp. 191-236.
Chun-Fa Chang et al., "LDI Tree: A Hierarchical Representation for Image-Based Rendering," Computer Graphics Proceedings, Annual Conference Series, 1999, SIGGRAPH 99, Los Angeles, California, Aug. 8-13, 1999, pp. 291-298.
Andries van Dam, "3-D Viewing II," Introduction to Computer Graphics, Online!Sep. 21, 1998 pp. 1-20.

* cited by examiner

METHOD FOR REPRESENTING IMAGE-BASED RENDERING INFORMATION IN 3D SCENE

Priority is claimed to Patent Application Number 2001-40975 filed in Rep. of Korea on Jul. 9, 2001, herein incorporated by reference.

BACKGROUND OF THE INVENTION

1. Field of the Invention

The present invention relates to a method for enabling to use an Image-Based Rendering (IBR) technology in Animation Framework extension (AFX) technology.

2. Description of the Related Art

Since the beginning of research on 3-Dimensional (3D) graphics, achieving vividness as a real image has been the goal of researchers in the field. Therefore, researches on traditional rendering technologies using polygonal models have been carried out and as a result, modeling and rendering technologies have been developed enough to provide very vivid 3D environments. However, the process for generating a complicated model requires a lot of effort by experts and takes a great deal of time. Also, a vivid and complicated environment requires a huge amount of information and lowers efficiency in storage and transmission.

SUMMARY OF THE INVENTION

To solve the above problems, it is an objective of the present invention to provide a method for representing an object in a 3D scene, using an Image-Based Rendering (IBR) technology in the 3D scene.

To accomplish the objective of the present invention, there is provided a method for representing an object in a 3-Dimensional (3D) scene using an Image-Based Rendering (IBR) technology in the 3D scene, the method comprising the step of representing the object using image information and depth information on each point of the image.

It is preferable that in order to define a plane, fields for defining a visual position from which the plane is seen, an orientation in which the plane is seen, and the width and length of a field of view are included.

Also to accomplish an objective of the present invention, there is provided a method for representing an object in a 3-Dimensional (3D) scene using an Image-Based Rendering (IBR) technology in the 3D scene, the method comprising a step of representing geometric information of a model, in which if a cube containing the model exists, the cube is expressed by a node, and after evenly dividing the cube into 8 cubes, each of divided cube is managed as a child node, and the child node which contains a part of the model is evenly divided into 8 nodes, and this process is repeated till the size of a node is small enough.

BRIEF DESCRIPTION OF THE DRAWINGS

Various objects and advantages of the present invention will become more apparent by describing in detail preferred embodiments thereof with reference to the attached drawings in which.

DESCRIPTION OF THE PREFERRED EMBODIMENTS

Recently, the Image-Based Rendering (IBR) technology capable of generating vivid scenes by using real images or pictures has been actively studied. The IBR technology enables seeing an object in a plurality of directions by using a plurality of images obtained in advance. Therefore, unlike the traditional rendering in which the amounts of information and computation increase with respect to complexity of a model in a scene, the IBR technology enables to reproduce a vivid scene with information and computation independent of complexity.

JTC1/SC29/WG11 Group under the international standardization organization, International Organization for Standardization/International Electrotechnical Commission (ISO/IEC) has established a standard, MPEG-4 Systems (14496-1), which enables to represent a 3D scene. To extend the standard, standardization of Animation Framework extension (AFX) by a subgroup, MPEG SNHC, has been under way.

The IBR technology is implemented in a variety of ways. First, in order to see from one place in a plurality of directions, scenes of all directions are photographed from one place, and then the photographed scenes are connected as a panoramic image and provided for watching. In order to see movement along a plurality of places, scenes of all direction are photographed in each of the plurality of places. However, such methods need too much image data. To solve this problem, a technology using geometric data together with image data has been developed.

Figure 1:
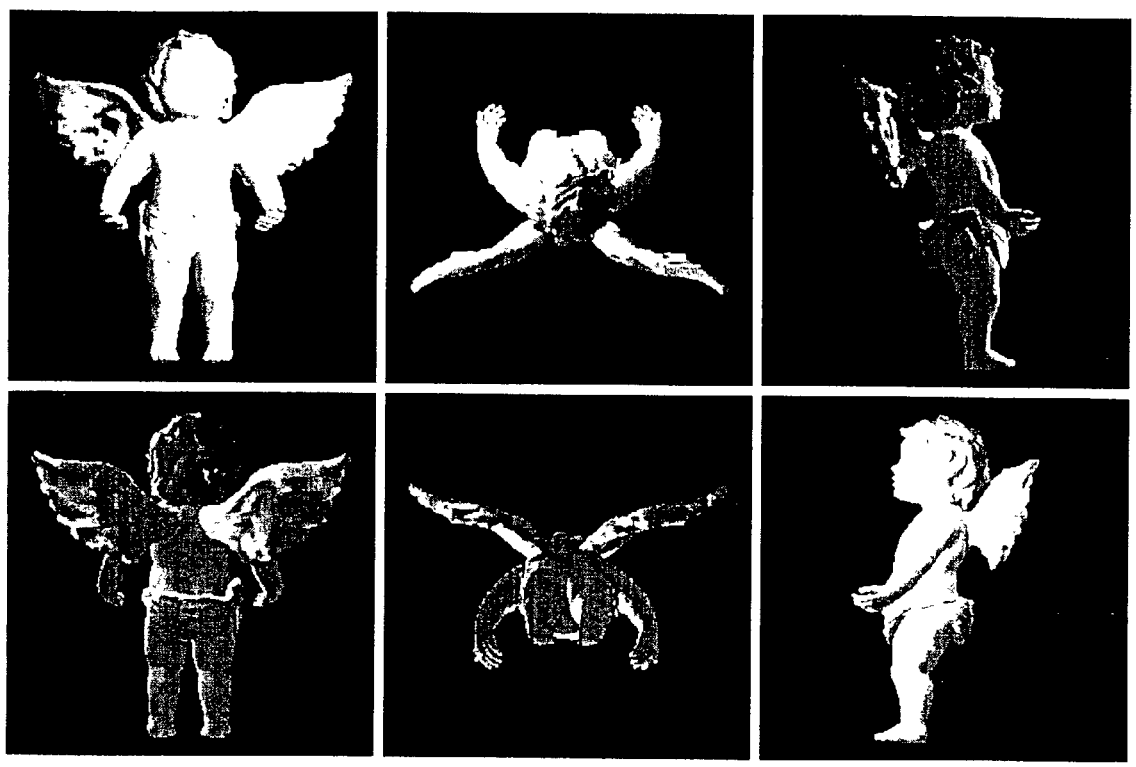
FIG. 1 is a diagram of an example of image information used in a box texture.
Figure 2:
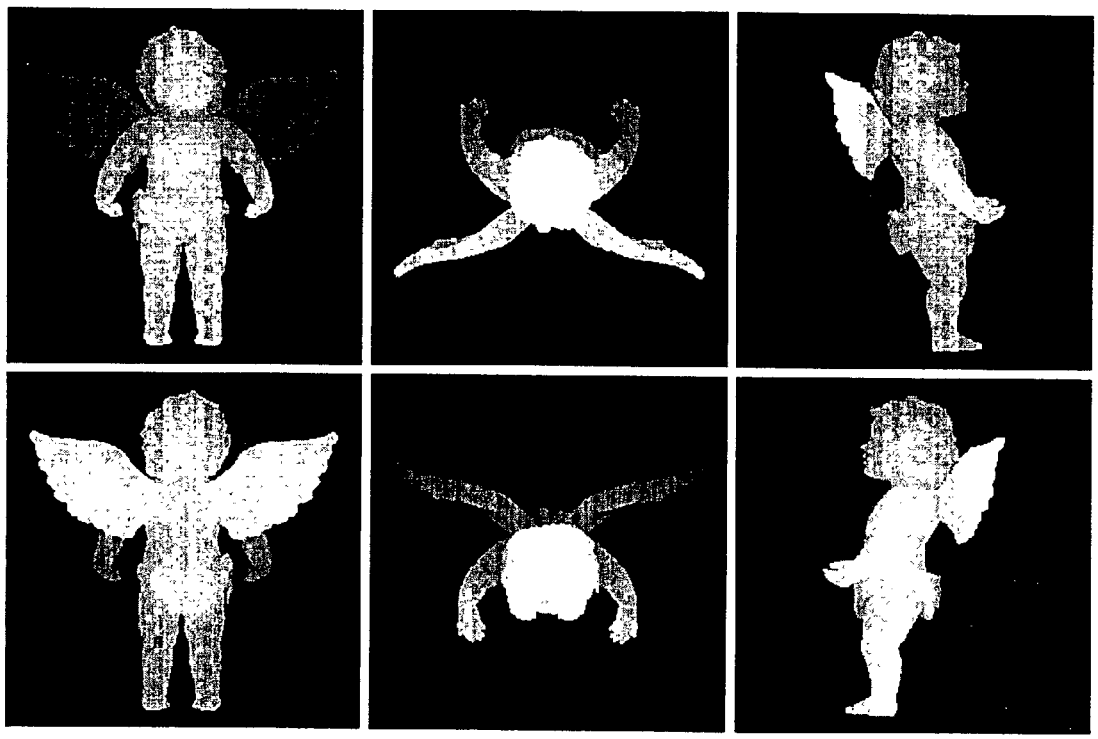
FIG. 2 is a diagram of an example of depth information used in a box texture.
Figure 3:
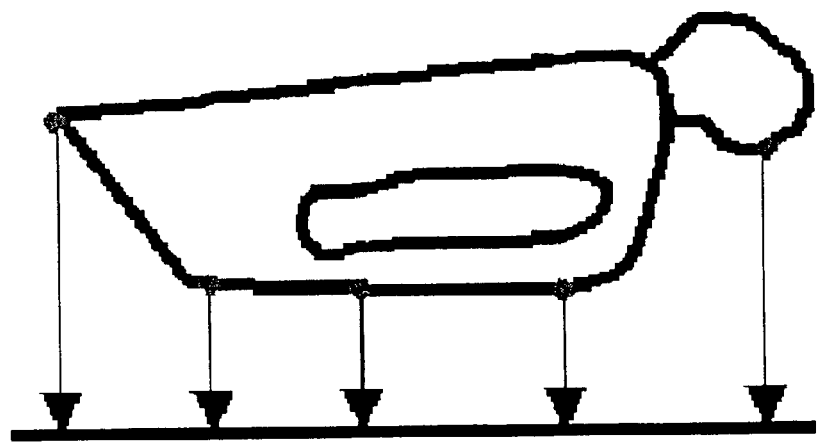
FIG. 3 is a diagram of an example of projecting each point in order to generate information on a relief texture.

There are a variety of technologies in the IBR technology using geometric representations. Among them, a surface light field technology or a view-dependent texture technology enables high picture quality but needs complicated geometric information. Meanwhile, a Relief Texture (RT) technology provides a texture with a cubic effect by using an image and depth information on each point of the image. When the RT technology is applied to a cube, the technology is referred to as a Box Texture (BT). In this case, six images corresponding to six surfaces of a cube, as shown in FIG. 1, and depth information corresponding to each image, as shown in FIG. 2, are used. When the BT is applied to an arbitrary number of planes, instead of a cube, the technology can be referred to as a Generalized Box Texture (GBT). If image information and depth information of these technologies (RT, BT, or GBT) are compressed using an ordinary image compression technology, the amount of information can be minimized. However, since these technologies use information only on points that can be seen from a plane, as shown in FIG. 3, information on positions which cannot be seen from the plane is lost.

Figure 4:
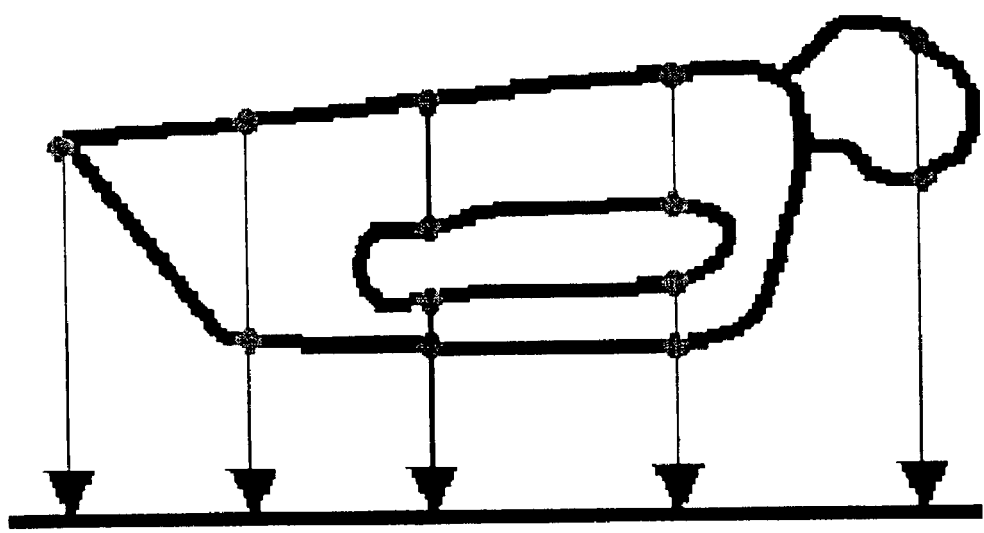
FIG. 4 is a diagram of an example of projecting each point in order to generate information on a layered depth image.
Figure 5:
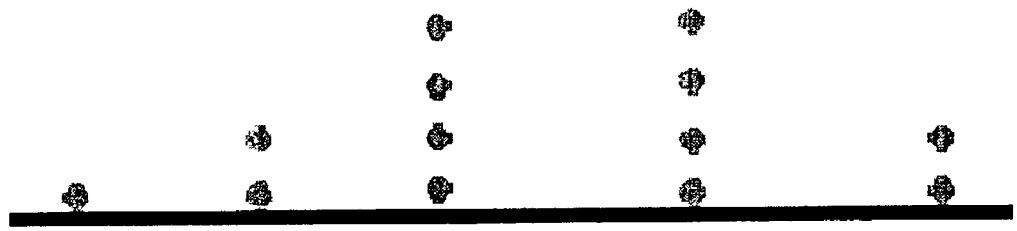
FIG. 5 is a diagram an example in which each point is projected in order to generate information on a layered depth image.

To solve this problem, a Layered Depth Image (LDI) technology may be used. In the LDI technology, as shown in FIG. 4, colors and distances of all points which are projected onto a point on a plane are stored. Therefore, as shown in FIG. 5, information on a plurality of points corresponding to each point on the plane is generated. Though the LDI technology needs more information than RT or BT technology, the LDI technology maintains information on all points.

Among other methods than using depth information, there is a method storing geometric information in an Octree structure. In the Octree structure, a cube is expressed by a node, and after evenly dividing the cube into 8 cubes, each divided cube is managed as a child node. When a cube contains a model, a node expressing this cube is evenly divided into 8 cubes, and then among the child nodes, a node containing a part of the model is again evenly divided into 8 cubes. If this dividing process is repeated until the size of divided nodes is small enough, geometric information of the model can be expressed by the Octree. One example of the IBR technology storing geometric information using the Octree structure is a Binary Volumetric Octree (BVO) technology.

In embodiments of the present invention, expression methods of GBT, LDI, and Octree methods, which are simple technologies among IBR technologies using geometric information, are used as defined as follows, and can be applied to the MPEG-4 AFX.

The GBT and LDI, both using depth information, may be used together with each other. The GBT and LDI use a DepthImageGroup node which manages depth information elements as a group. Table 1 shows the definition of the DepthImageGroup node. The DepthImageGroup manages DepthImage nodes in an array named depthImage.

TABLE 1

| DepthImageGroup { | | |
|---|---|---|
| evenin | MFNode | addDepthImage |
| evenin | MFNode | removeDepthImage |
| exposedField | MFNode | depthImage [] |
| } | | |

Table 2 shows the definition of the DepthImage node. The DepthImage node manages image information on a plane and depth information included in a predetermined range.

TABLE 2

| DepthImage { | | | | |
|---|---|---|---|---|
| field | SFNode | diTexture | NULL | |
| field | SFVec3f | position | 0 0 10 | |
| field | SFRotation | orientation | 0 0 1 0 | |
| field | SFVec2F | fieldOfView | 0.785398 | 0.785398 |
| field | SFFloat | nearPlane | 10 | |
| field | SFFloat | farPlane | 100 | |
| field | SFBool | orthogonal | FALSE | |
| } | | | | |

First, in order to define a plane, a visual position from which the plane is seen and an orientation in which the plane is seen are defined, and the width and length of a field of view (fieldOfView) are defined. Then, in order to define the range of depth information, the distance from a viewpoint to a near boundary plane (nearPlane) and the distance from the viewpoint to a far boundary plane (farPlane) are defined. Among projection methods using these information elements, there are two types of projections, an orthogonal projection and a perspective projection, and orthogonal information is a parameter for determining a projection method. When orthogonal information is true, the width value and length value of the fieldOfView field are used as the width size and length size of boundary planes, respectively. When orthogonal information is false, the width value and length value of the fieldOfView field are used as the degree of the angle of the width field of view and the degree of the angle of the length field of view, respectively. Also, diTexture has image information and depth information.

For the diTexture field having image information and depth information, one of three IBR textures nodes (SimpleTexture, LayeredTexture, and PointTexture) can be used. The SimpleTexture node has one image information element (Texture) and one depth information element (depth).

Table 3 shows the definition of the SimpleTexture node. This can express one RT information element.

TABLE 3

| SimpleTexture { | | | |
|---|---|---|---|
| field | SFNode | Texture | NULL |
| field | SFNode | depth | NULL |
| } | | | |

The LayeredTexture node can have a plurality of image information elements (Textures [ ]) and the same number of depth information elements (depths [ ]) as the image information elements. Table 4 shows the definition of the LayeredTexture node. This can express one LDT information element. For the SimpleTexture node and the LayeredTexture node, a texture node (ImageTexture, MovieTexture, PixelTextures, etc.) used in the MPEG-4 can be used. When moving picture information such as MovieTexture is used, IBR information can be animated.

TABLE 4

| LayeredTexture { | | | |
|---|---|---|---|
| field | MFNode | Textures | [] |
| field | MFNode | depths | [] |
| } | | | |

The PointTexture node has a depth information array (depth[ ]) on all points projected to each point on a plane and a color array (color[ ]) of each point. Table 5 shows the definition of the PointTexture node. The depth information array stores the number of points in a space projected to each point on the plane, and then stores each corresponding depth information element.

TABLE 5

| PointTexture { | | | |
|---|---|---|---|
| field | MFInt32 | depth | [] |
| field | MFColor | color | [] |
| } | | | |

A node capable of managing Octree information can be defined as an OctreeImage node of table 6.

TABLE 6

| OctreeImage { | | | |
|---|---|---|---|
| field | SFInt32 | Octreelevel | 8 |
| field | MFNode | OctreeImages | [] |
| field | SFFloat | Octreesize | 1 |
| field | SFString | Octree | "" |

TABLE 6-continued

| | field | MFVec3f | Octreenormal | [] |
| | field | MFColor | Octreecolor | [] |
| } | | | | |

In the octreelevel field, the highest level of the tree structure is defined. For example, the value of the Octreelevel is 8, the Octree structure can be built up to 8 levels hierarchically. Therefore, along one side of the cube, maximum 256 leaf nodes can be generated. Octreeimage[ ] denotes an array of the DepthImage nodes. At this time, in the diTexture field of the DepthImage node, the SimpleTexture node should be used and the nearPlane and farPlane fields of the DepthImage node and the depth field of SimpleTexture node are not used. The Octreesize field indicates the length of a side of the cube. For placement of the cube, the origin of the coordinate system is placed at the center of the cube.

Figure 6:
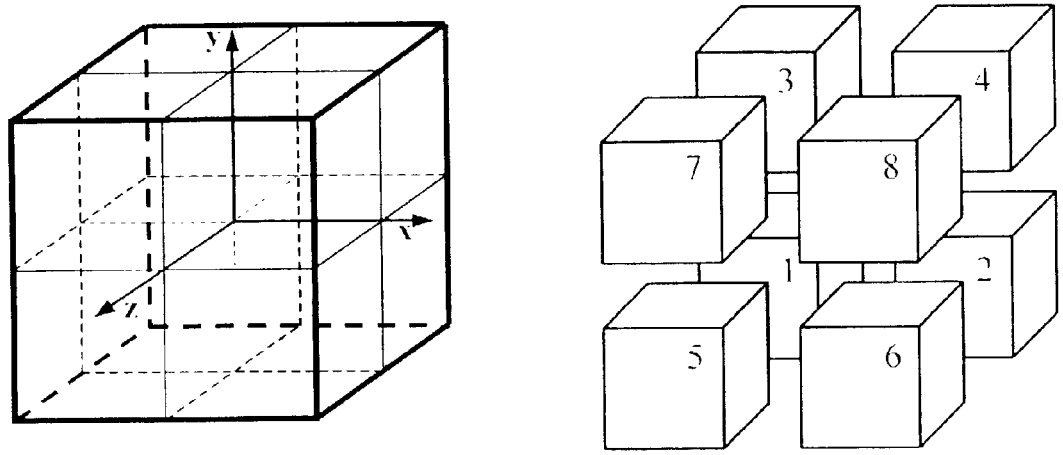
FIG. 6 is a schematic diagram showing the order of child nodes in an Octree.

The Octree field has an array for indicating the structure of inner nodes of the Octree. Each node contains information on child nodes which is 1 byte long. If the i-th bit is 1, the node has child nodes. The order of child nodes may be defined as shown in FIG. 6. The arranging order of each node in the Octree array is a breadth first search order. That is, after information elements on a node of the top level, information elements on nodes of the second highest level are placed, and then those of next level are arranged. The Octreenormal [ ] field and Octreecolor [ ] field can be optionally used, and can store normal information and color information, respectively, of each Octree node.

In order to express geometric information in the IBR, there are methods (GBT, LDI) using depth information and a method (Octree) using structural information. According to a preferred embodiment of the present invention, a node is defined so that the geometric information can be used in the MPEG4 AFX.

Figure 7:
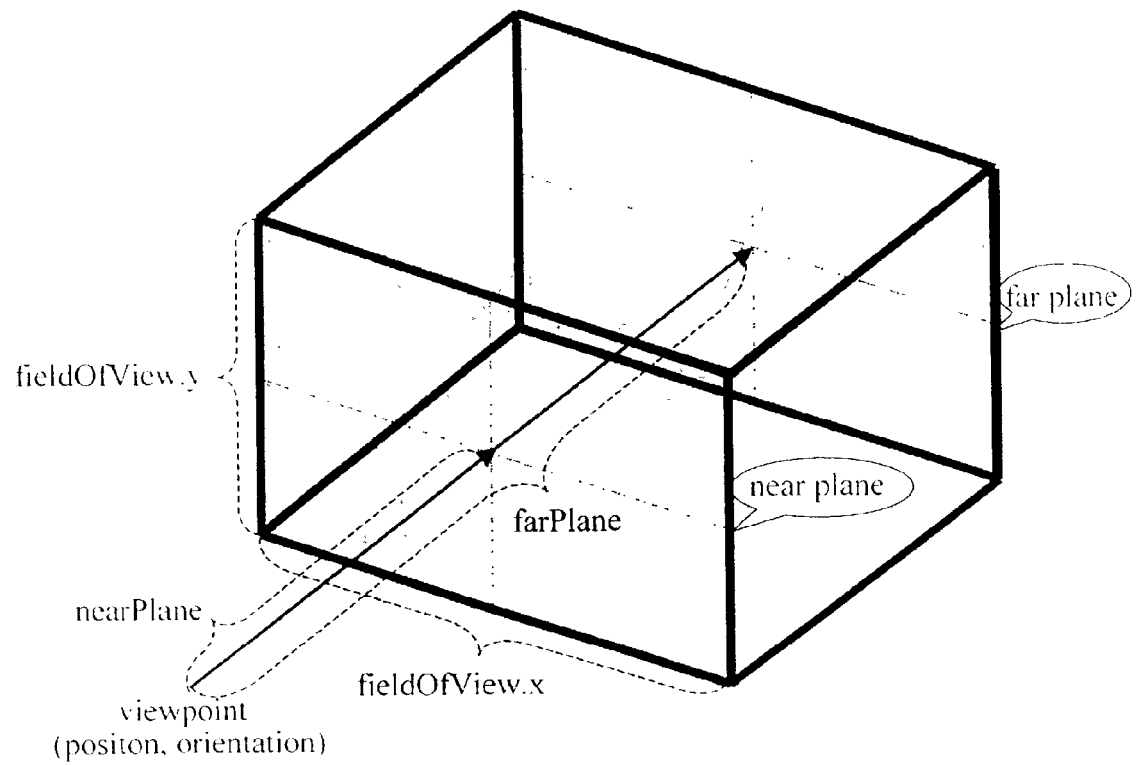
FIG. 7 is a diagram showing each field of a DepthImage node applied to orthogonal projection.
Figure 8:
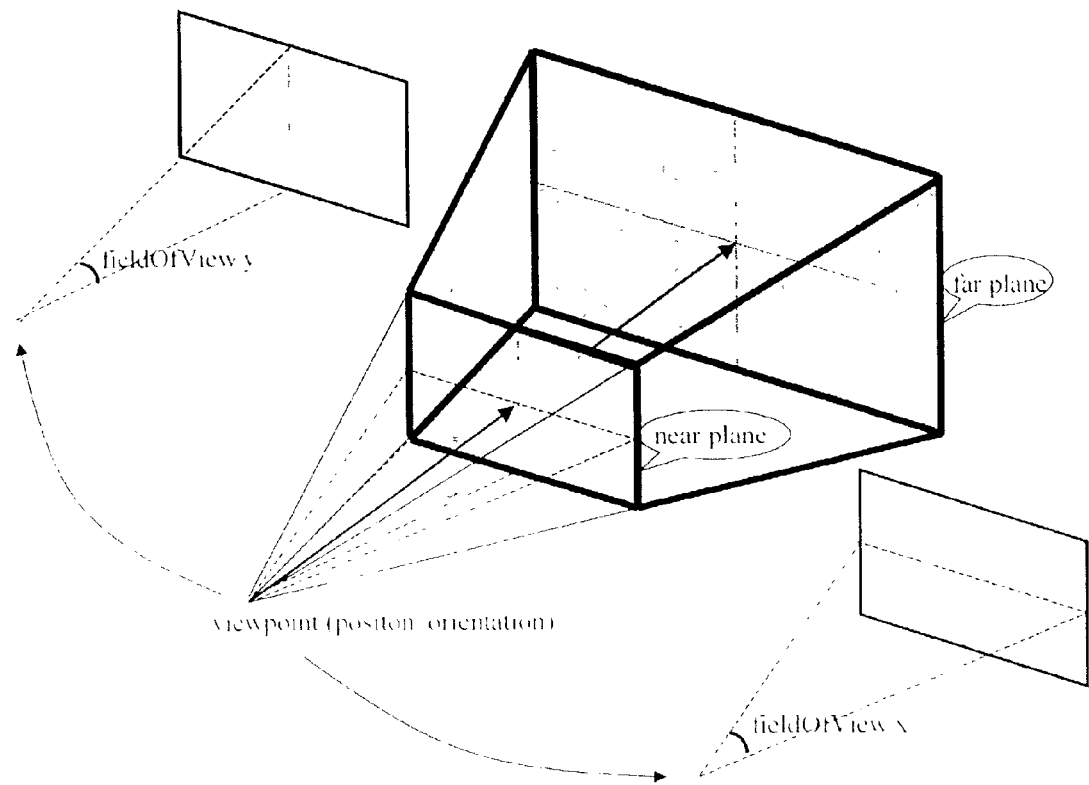
FIG. 8 is a diagram showing each field of a DepthImage node applied to perspective projection.
Figure 9:
FIG. 9 is a diagram of a rendering example using box texture information.

FIG. 7 shows the meaning of each field of the DepthImage node, defined as table 2, applied to orthogonal projection. FIG. 8 shows the meaning of each field of the DepthImage node applied to perspective projection. The DepthImage node manages information on points projected onto the near plane, which is near to the viewpoint, for an object defined inside the hexahedron marked by bold lines in FIG. 7 or 8. FIG. 9 shows a result obtained by a program using the Box Texture technology which applies the IBR to a cube.

Figure 10:
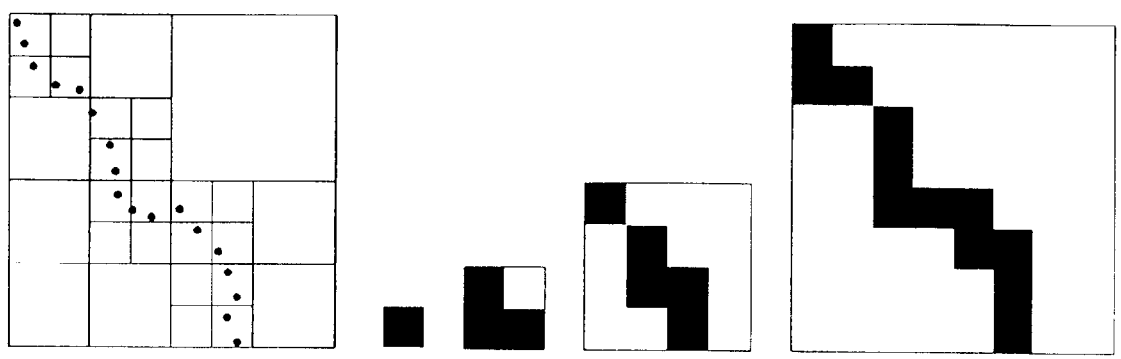
FIG. 10 is a sectional view of an Octree structure.
Figure 11:
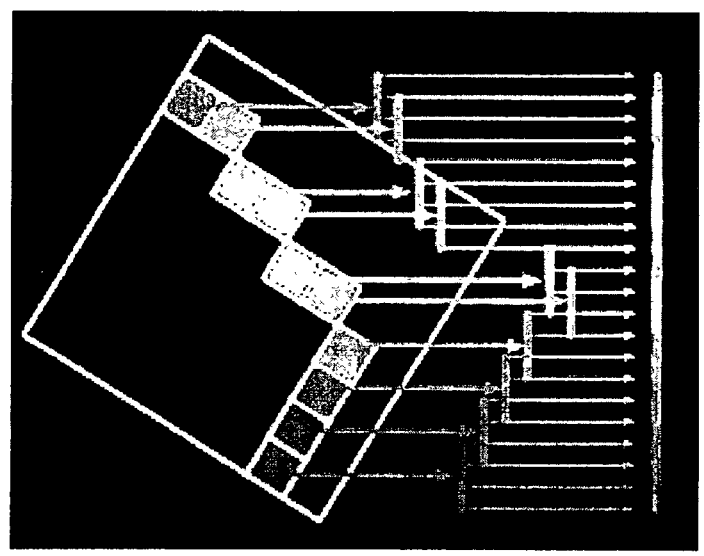
FIG. 11 is a schematic diagram showing a rendering method for Octree structure information.

FIG. 10 is a sectional view of the Octree structure. In order to express an object inside a cube as Octree, a node containing a surface of the object is repeatedly divided. The more times the node is divided, the more precisely the object can be represented. In rendering the object to a screen, nodes are displayed in order of distance from a node placed farthest from the screen, as shown in FIG. 11.

According to the present invention, using an image-based rendering technology in a 3D scene, a method and apparatus for representing an object in the 3D scene are provided. In particular, in ISO/IEC 14496 (MPEG4) or in Virtual Reality Modeling Language (VRML), using the image-based rendering technology in a 3D scene, an object in the 3D scene can be represented. Here, using the GBT technology, LDI technology or BVO technology, an object in the 3D scene can be rendered.

The present invention may be embodied in a code, which can be read by a computer, on a computer readable recording medium. The computer readable recording medium includes all kinds of recording apparatuses on which computer readable data are stored. The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode. Also, the structure of data or a database required in performing the method according to the present invention may be recorded in the recording medium as described above and by operating the computer program, desired functions and effects may be obtained.

As described above, in embodiments of the present invention, by defining expression methods for GBT, LDI, and Octree that are simple method among IBR technologies having geometric information, they can be used in the MPEG-4 AFX. The IBR expressions defined in embodiments of the present invention are simple and easy to use, and if used with an image compression technology provided by the MPEG-4, data can be efficiently compressed and transmitted. Also, when moving pictures are used, the IBR technology enables animation. With the nodes defined in embodiments of the present invention, the IBR can be used in a method for expressing a 3D scene such as the VRML as well as the MPEG-4. Embodiments of the present invention provides a method and apparatus for expressing the IBR technology so that the IBR technology can be used in the MPEG-4AFX.

What is claimed is:

1. A computer programmable method for graphic animation of an object in a 3-Dimensional (3D) scene using an Image-Based Rendering (IBR) technology in the 3D scene, the method comprising the steps of:
   electronically representing the object using image information and depth information on each point of the image; and
   producing a display representation of the object, wherein the depth information includes
      a position field for defining a visual position from which a plane is seen, an orientation field for defining an orientation in which the plane is seen, and a field of view for defining the width and length of a field of view, in order to define the plane;
      a near plane field for defining the distance from the visual position to a closer boundary plane and a far plane field for defining the distance from the visual position to a farther boundary plane, in order to determine the range of depth information; and
      a field for indicating whether a projection method is orthogonal projection or perspective projection.

2. The method of claim 1, wherein in the orthogonal projection method, the width value and length value of the field of view indicate the width size and length size of the boundary plane, and in the perspective projection method, the width value and length value of the field of view indicate the degree of the angle of the width field of view and the degree of the angle of the length field of view, respectively.

3. A computer readable medium having embodied thereon a computer program for the method of claim 1.

4. A computer programmable method for graphic animation of an object in a 3-Dimensional (3D) scene using an Image-Based Rendering (IBR) technology in the 3D scene, the method comprising the steps of:
   electronically representing the object using a depth information array with respect to all points projected on each point of a plane of the object, and a color information array with respect to all points; and producing a display representation of the object, wherein a depth information for each point includes a position field for defining a visual position from which the plane is seen, an orientation field for defining an orientation in which the plane is seen, and a field of view for defining the width and length of a field of view, in order to define the plane;

a near plane field for defining the distance from the visual position to a closer boundary plane and a far plane field for defining the distance from the visual position to a farther boundary plane, in order to determine the range of depth information; and a field for indicating whether a projection method is orthogonal projection or perspective projection is included.

5. The method of claim 4, wherein in the orthogonal projection method, the width value and length value of the field of view indicate the width size and length size of the boundary plane, and in the perspective projection method, the width value and length value of the field of view indicate the degree of the angle of the width field of view and the degree of the angle of the length field of view, respectively.

6. A computer programmable method for graphic animation of an object in a 3-Dimensional (3D) scene using an Image-Based Rendering (IBR) technology in the 3D scene, the method comprising the steps of:

electronically representing geometric information of a model; and producing a display representation of the object, wherein if a cube containing the model exists, the cube is expressed by a node, and after evenly dividing the cube into 8 cubes, each of divided cube is managed as a child node, and the child node which contains a part of the model is evenly divided into 8 nodes arranged in a breadth-first search order, and wherein each node contains information on child nodes which is 1 byte long.

7. The method of claim 6, wherein the node comprises:

an Octreelevel field for defining a maximum level of a tree structure;

an Octreesize field for indicating the length of a side of the cube; and an Octree field which is an array for indicating the structure of inner nodes of the Octree.

8. A computer readable medium having embodied thereon a computer program for the method of claim 4.

9. A computer readable medium having embodied thereon a computer program for the method of claim 6.

10. The method of claim 6, wherein the node comprises:

an Octreelevel field for defining a maximum level of a tree structure;

an Octreeimage field for representing image information with respect to points projected from each plane of the cube; and an Octree field which is an array for indicating the structure of child nodes of the Octree.

11. The method of claim 10, wherein the image information for each point including a position field for defining a visual position from which the plane is seen, an orientation field for defining an orientation in which the plane is seen, and a field of view for defining the width and length of a field of view, in order to define the plane; and a near plane field for defining the distance from the visual position to a closer boundary plane and a far plane field for defining the distance from the visual position to a farther boundary plane, in order to determine the range of depth information.

12. A computer programmable method for graphic animation of an object in a 3-Dimensional (3D) scene using an Image-Based Rendering (IBR) technology in the 3D scene, the method comprising the steps of:

electronically representing geometric information of a model; and producing a display representation of the object, wherein if a cube containing the model exists, the cube is expressed by a node, and after evenly dividing the cube into 8 cubes, each divided cube is managed as a child node, and the child node which contains a part of the model is evenly divided into 8 nodes, wherein the node comprises:

an Octreelevel field for defining a maximum level of a tree structure;

an Octreeimage field for representing image information with respect to points projected from each plane of the cube; and an Octree field which is an array for indicating the structure of child nodes of the Octree; and wherein the image information for each point includes:

a position field for defining a visual position from which the plane is seen, an orientation field for defining an orientation in which the plane is seen, and a field of view for defining the width and length of a field of view, in order to define the plane; and a near plane field for defining the distance from the visual position to a closer boundary plane and a far plane field for defining the distance from the visual position to a farther boundary plane, in order to determine the range of depth information.

* * * * *